(12) United States Patent
Mora

(10) Patent No.: US 11,941,642 B2
(45) Date of Patent: *Mar. 26, 2024

(54) QUEUE MANAGEMENT SYSTEM UTILIZING VIRTUAL SERVICE PROVIDERS

(71) Applicant: ACF Technologies, Inc., Asheville, NC (US)

(72) Inventor: Jose Gregorio Mora, Miami, FL (US)

(73) Assignee: ACF Technologies, Inc., Asheville, NC (US)

( * ) Notice: Subject to any disclaimer, the term of this patent is extended or adjusted under 35 U.S.C. 154(b) by 10 days.

This patent is subject to a terminal disclaimer.

(21) Appl. No.: 17/729,443

(22) Filed: Apr. 26, 2022

(65) Prior Publication Data

US 2022/0253867 A1 Aug. 11, 2022

Related U.S. Application Data

(63) Continuation of application No. 15/664,815, filed on Jul. 31, 2017, now Pat. No. 11,341,506.

(Continued)

(51) Int. Cl.
*G06Q 30/016* (2023.01)
*G06Q 10/0631* (2023.01)
(Continued)

(52) U.S. Cl.
CPC ... *G06Q 30/016* (2013.01); *G06Q 10/063114* (2013.01); *G06Q 50/01* (2013.01); *H04L 51/52* (2022.05); *G06F 16/285* (2019.01)

(58) Field of Classification Search
None
See application file for complete search history.

(56) References Cited

U.S. PATENT DOCUMENTS 6,059,184 A 5/2000 Ahlstrom et al.
6,771,766 B1 8/2004 Shafiee et al.
(Continued)

FOREIGN PATENT DOCUMENTS

CA 2915663 A1 1/2015
EP 1247226 A1 10/2002
(Continued)

OTHER PUBLICATIONS

'Smart Queue System', [database online], Jun. 2016, p. 3: discloses allows a customer to walk-in to a service location [e.g.: bank branch] and request a service token from his smart phone mobile device. (Year: 2016).*

(Continued)

*Primary Examiner* — Lynda Jasmin
*Assistant Examiner* — Ehrin L Pratt
(74) *Attorney, Agent, or Firm* — Nelson Mullins Riley & Scarborough LLP

(57) ABSTRACT

A queue management system is provided having a customer device and service provider computing devices in different service provider facilities. The customer device is configured to prompt customers to select a services, receive a customer service request, and facilitate communication between the customer and a service provider in a first service provider facility. The system includes a server that receives availability information for service provider computing devices; generate virtual queues; receives a customer service request from a customer device identifying service type requested; assigns the customer service request to a virtual queue based on the availability information associated with the plurality of service providers and the service type requested; and notifies the customer of the assignment. The server is configured to consider a virtual queue for both an in-person service provider and a remote service provider (Continued)

when determining the virtual queue that the customer should be assigned to.

20 Claims, 5 Drawing Sheets

Related U.S. Application Data

(60) Provisional application No. 62/510,316, filed on May 24, 2017, provisional application No. 62/420,102, filed on Nov. 10, 2016, provisional application No. 62/368,304, filed on Jul. 29, 2016.

(51) Int. Cl.
*G06Q 50/00* (2012.01)
*H04L 51/52* (2022.01)
*G06F 16/28* (2019.01)

(56) References Cited

U.S. PATENT DOCUMENTS

| | | |
|---|---|---|
| 7,046,790 B2 | 5/2006 | Holmen |
| 7,516,148 B2 | 4/2009 | Waytena et al. |
| 7,590,550 B2 | 9/2009 | Schoenberg |
| 8,081,749 B1 | 12/2011 | Shaffer et al. |
| 8,306,568 B2 | 11/2012 | Snyder |
| 8,731,180 B2 | 5/2014 | Benefield et al. |
| 8,788,607 B2 | 7/2014 | Lee et al. |
| 8,831,963 B2 | 9/2014 | Backer et al. |
| 9,009,702 B2 | 4/2015 | Tsirkin |
| 9,065,916 B2 | 6/2015 | Oristian et al. |
| 9,065,972 B1 | 6/2015 | Arthur et al. |
| 9,164,789 B2 | 10/2015 | Tsirkin et al. |
| 9,178,997 B2 | 11/2015 | Oristian et al. |
| 9,332,044 B2 | 5/2016 | Cortes et al. |
| 9,332,224 B2 | 5/2016 | Assem Aly Salama et al. |
| 9,355,530 B1 * | 5/2016 | Block .................. G06Q 20/405 |
| 9,392,163 B2 | 7/2016 | Wu et al. |
| 10,237,225 B1 | 3/2019 | Ande et al. |
| 2002/0059587 A1 | 5/2002 | Cofano et al. |
| 2002/0114323 A1 | 8/2002 | Chowdhury et al. |
| 2003/0035531 A1 | 2/2003 | Brown et al. |
| 2003/0037113 A1 | 2/2003 | Petrovykh |
| 2003/0177141 A1 | 9/2003 | Sahlin |
| 2006/0186197 A1 | 6/2006 | Rosenberg |
| 2006/0253358 A1 | 11/2006 | Delgrosso et al. |
| 2007/0042748 A1 | 2/2007 | MacArthur |
| 2008/0065414 A1 | 3/2008 | Schoenberg |
| 2008/0133283 A1 | 6/2008 | Backer et al. |
| 2009/0047461 A1 | 2/2009 | Sporrong |
| 2009/0276704 A1 | 11/2009 | Finn et al. |
| 2009/0325629 A1 | 12/2009 | Snyder |
| 2010/0117790 A1 | 5/2010 | Bayne et al. |
| 2010/0169147 A1 | 7/2010 | McCormack et al. |
| 2010/0198647 A1 | 8/2010 | Bowers, Jr. et al. |
| 2010/0250612 A1 | 9/2010 | Reuveni et al. |
| 2010/0277276 A1 | 11/2010 | Bayne et al. |
| 2011/0178960 A1 | 7/2011 | Dever et al. |
| 2011/0261144 A1 | 10/2011 | Benefield et al. |
| 2011/0307547 A1 * | 12/2011 | Backer ............... G06Q 10/1095 |
| | | 709/203 |
| 2012/0158597 A1 | 6/2012 | Malik |
| 2013/0030875 A1 | 1/2013 | Lee et al. |
| 2013/0138570 A1 | 5/2013 | Ross |
| 2013/0151296 A1 | 6/2013 | Waytena et al. |
| 2013/0262320 A1 | 10/2013 | Makanawala et al. |
| 2014/0046718 A1 | 2/2014 | Schiller |
| 2014/0052463 A1 | 2/2014 | Cashman et al. |
| 2014/0089075 A1 | 3/2014 | Sanchis et al. |
| 2014/0100925 A1 | 4/2014 | Popescu et al. |
| 2014/0156290 A1 | 6/2014 | Kozicki et al. |
| 2014/0156293 A1 | 6/2014 | Kozicki et al. |
| 2014/0270133 A1 | 9/2014 | Conway et al. |
| 2014/0343977 A1 | 11/2014 | Macina |
| 2014/0343995 A1 | 11/2014 | Backer et al. |
| 2015/0032675 A1 | 1/2015 | Huehn et al. |
| 2015/0059002 A1 | 2/2015 | Balram et al. |
| 2015/0262188 A1 | 2/2015 | Franco |
| 2015/0081569 A1 | 3/2015 | Moore et al. |
| 2015/0088782 A1 | 3/2015 | Zhang |
| 2015/0142684 A1 | 5/2015 | Ng |
| 2015/0170152 A1 | 6/2015 | Shaffer et al. |
| 2015/0193997 A1 | 7/2015 | Butler |
| 2015/0195407 A1 | 7/2015 | Kaufman |
| 2015/0304227 A1 | 10/2015 | Yang et al. |
| 2015/0304366 A1 | 10/2015 | Bader-Natal et al. |
| 2015/0304607 A1 | 10/2015 | Bader-Natal et al. |
| 2015/0310261 A1 | 10/2015 | Lee et al. |
| 2015/0371303 A1 | 12/2015 | Suri et al. |
| 2016/0012375 A1 | 1/2016 | Hanson et al. |
| 2016/0012496 A1 | 1/2016 | Hanson et al. |
| 2016/0078528 A1 | 3/2016 | Pradeep et al. |
| 2016/0132847 A1 * | 5/2016 | Sarris ................. G06Q 20/1085 |
| | | 705/42 |
| 2017/0149722 A1 | 5/2017 | Fernandez Acuna et al. |
| 2017/0161670 A1 * | 6/2017 | Ng .................. G06Q 10/063114 |
| 2017/0270399 A1 | 9/2017 | Ross |
| 2018/0032939 A1 | 2/2018 | Balakrishnan |

FOREIGN PATENT DOCUMENTS

| | | |
|---|---|---|
| NO | 322430 B1 | 10/2006 |
| SE | 521424 C2 | 10/2003 |
| WO | WO 2012/170958 A1 | 12/2012 |
| WO | WO 2014/0194939 A1 | 12/2014 |
| WO | WO 2015/148695 A1 | 10/2015 |
| WO | WO 2015/164380 A1 | 10/2015 |

OTHER PUBLICATIONS

International Search Report and Written Opinion of the International Search Authority for corresponding International Application No. PCT/US2017/044718 dated Oct. 17, 2017.
International Search Report and Written Opinion of the International Search Authority for corresponding International Application No. PCT/US2017/044721 dated Oct. 20, 2017.
International Search Report and Written Opinion of the International Search Authority for corresponding International Application No. PCT/US2017/044732 dated Oct. 17, 2017.
Office Action for U.S. Appl. No. 15/664,804 dated Apr. 22, 2019.
Office Action issued in U.S. Appl. No. 15/664,804 dated Mar. 18, 2020.
U.S. Final Office Action in U.S. Appl. No. 15/664,786, dated Dec. 7, 2020, 45 pages.
European Search Report for EP Application No. 17835427.0 dated Jan. 14, 2020 (11 pages).
European Search Report for EP Application No. 17835423.9 dated Jan. 14, 2020 (12 pages).
Final Office Action for U.S. Appl. No. 15/664,804; dated Nov. 7, 2019; 28 pages.
Final Office Action for U.S. Appl. No. 15/664,804; dated Aug. 4, 2020; 45 pages.
Communication pursuant to Article 94(3) for EP Application No. 17835424.7 dated Apr. 28, 2021; (9 pages).
Communication pursuant to Article 94(3) for EP Application No. 17835423.9 dated Feb. 18, 2021; 9 pages.
Non Final Office Action dated Mar. 3, 2021 issued in U.S. Appl. No. 15/664,804; 43 pages.
Acharya, A., Manweiler, J., Sharma S., Banerjee, N.; "Presence Based Open Contact Center Leveraging Social Networks", [online, 2013 IFIP/IEEE International Symposium on Integrated Network Management, pp. 1-14{Retrieved on Jan. 0, 2022} from https://ieeexplore.ieee.org/document/6 (Year 2013).
Preliminary Office Action for Brazilian Patent Application N° BR112019001758-5 with English Machine Translation; dated Feb. 7, 2023 (5 pages).
Preliminary Office Action for Brazilian Patent Application N° BR112019001757-7 5 with English Machine Translation; dated Feb. 7, 2023 (5 pages).

(56) References Cited

OTHER PUBLICATIONS

Summons to Oral Proceedings for EP Application No. 17835424.7 mailed Nov. 25, 2021 (10 pages).
Communication pursuant to Article 94(3) for EP Application No. 17835427.0 dated Dec. 15, 2022; (7 pages).
Office Action for Mexican Patent Application N° MX/a/2019/001241 with English Machine Translation; dated Jul. 12, 2022 (8 pages).
Preliminary Office Action for Brazilian Patent Application N° BR112019001748-8; English Machine Translation; dated Apr. 10, 2023 (5 pages).
Extended European Search Report for EP Application No. 17835424.7 dated Jan. 14, 2020; (12 pages).
Office Action for Mexican Patent Application N° MX/A/2019/001240 with English Machine Translation; dated Oct. 24, 2022 (7 pages).
Office Action for Mexican Patent Application N° MX/A/2019/001240 with English Machine Translation; dated Jun. 28, 2022 (9 pages).
Office Action for Mexican Patent Application N° MX/a/2019/001246 with English Machine Translation; dated Jun. 24, 2022 (8 pages).
Communication pursuant to Article 94(3) for EP Application No. 17835423.9 dated Apr. 7, 2022; (5 pages).
Apple Patents Ticketing System Article; The Telegraph UK; Apr. 18, 2010 Website visited Oct. 2, 2017 http://www.telegraph.co.uk/technology/apple/7598997/Apple-patents-ticketing-system.htm.

\* cited by examiner

QUEUE MANAGEMENT SYSTEM UTILIZING VIRTUAL SERVICE PROVIDERS

CROSS REFERENCE TO RELATED APPLICATIONS

This application is a continuation of U.S. patent application Ser. No. 15/664,815, filed on Jul. 31, 2017 which claims the benefit of U.S. Provisional Application No. 62/368,304 filed on Jul. 29, 2016; U.S. Provisional Application No. 62/420,102 filed on Nov. 10, 2016; and U.S. Provisional Application No. 62/510,316 filed on May 24, 2017 the entire contents of each are hereby incorporated herein by reference. By extension, U.S. application Ser. Nos. 15/664,786 and 15/664,804, the non-provisional applications of the above-noted provisional applications, are also each are hereby incorporated herein by reference.

FIELD OF THE INVENTION

Embodiments disclosed herein generally relate to an improved queue management system incorporating and utilizing service providers in remote locations.

BACKGROUND

For walk-in businesses, customers often end up standing in long lines (or "queues") while waiting for their service provider, which can create a frustrating experience for the customer. In recent years, electronic queue management system ("QMS") have been developed to manage customer reception and flow management, converting physical lines of people into virtual queues. Customers can then relax in a comfortable lobby environment or leave the lobby to roam and are notified by various means when they have reached the front of the virtual queue and should advance to meet with a service provider in the location. Queue management systems, however, are functionally limited by the number of available service providers in the facility. Accordingly, customer wait times may be lengthy and frustrating even if the customers are not physically standing in lines. The present invention provides an improved queue management system which links with and utilizes service providers that are physically located in a facility which is different or remote from that of the location of the customer.

BRIEF DESCRIPTION OF THE DRAWINGS

Reference will now be made to the accompanying figures and diagrams, which are not necessarily drawn to scale, and wherein.

DETAILED DESCRIPTION

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner. Headings used herein are for convenience of reference only and should not in any way affect the interpretation of the invention. While the term "employee" is used herein, it is understood that this individual need not be an employee and could be any contractor, agent, or representative of the business.

Overview of the Invention

In an embodiment, the invention comprises an improved queue management system which utilizes remote service providers accessing customer cases, via queues, slots and calendar appointments, to provide direct service virtually through a single software interface. In an embodiment, the service providers described herein could comprise employees of various branches of State or Local government, such as the department of motor vehicles, health and human services, health departments; doctors, physician's assistants, or nurses in a multiple offices of a medical practice or within multiple locations of a hospital; veterinarians or vet techs in multiple offices of a veterinary practice; bank tellers in various branches of a bank; employees at multiple branches of Federal government such as the Social Security Administration (SSA), Internal Revenue Service (IRS), United States Post Office (USPS), or other similar government offices; student registration employees at universities having multiple locations; or any other entity known in the art.

Figure 3:
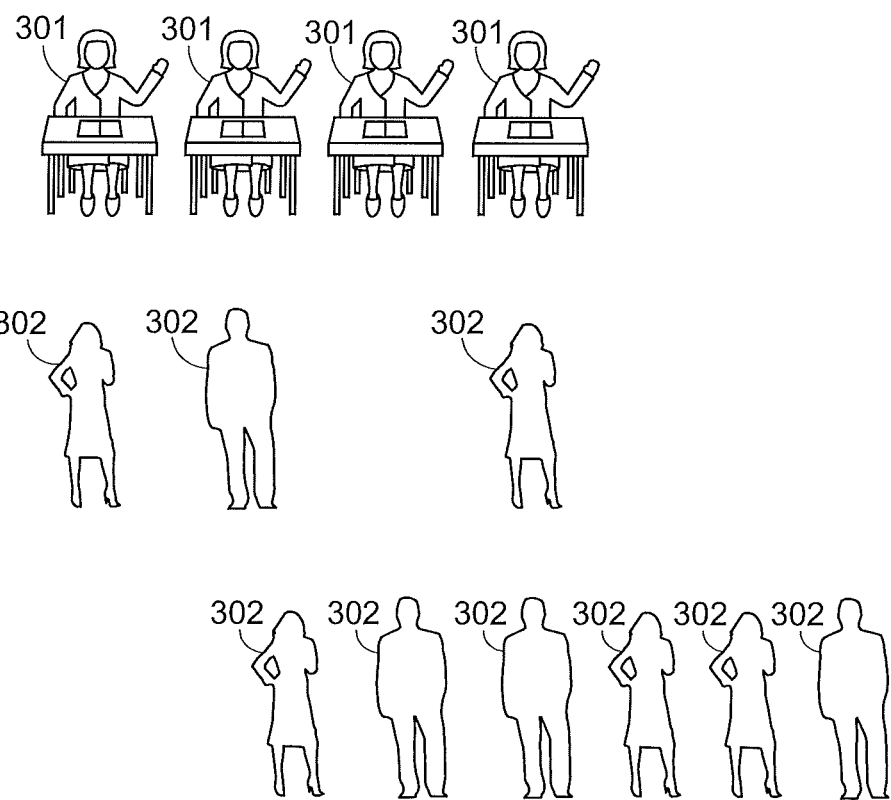
FIG. 3 shows a diagram of a prior art service provider location.

A prior art service provider, shown in FIG. 3, may have four (4) physical counter stations 301 where employees/agents can assist customers 302. In this facility, customers 302 would physically line up to be directed to a counter as an agent becomes available.

Figure 4:
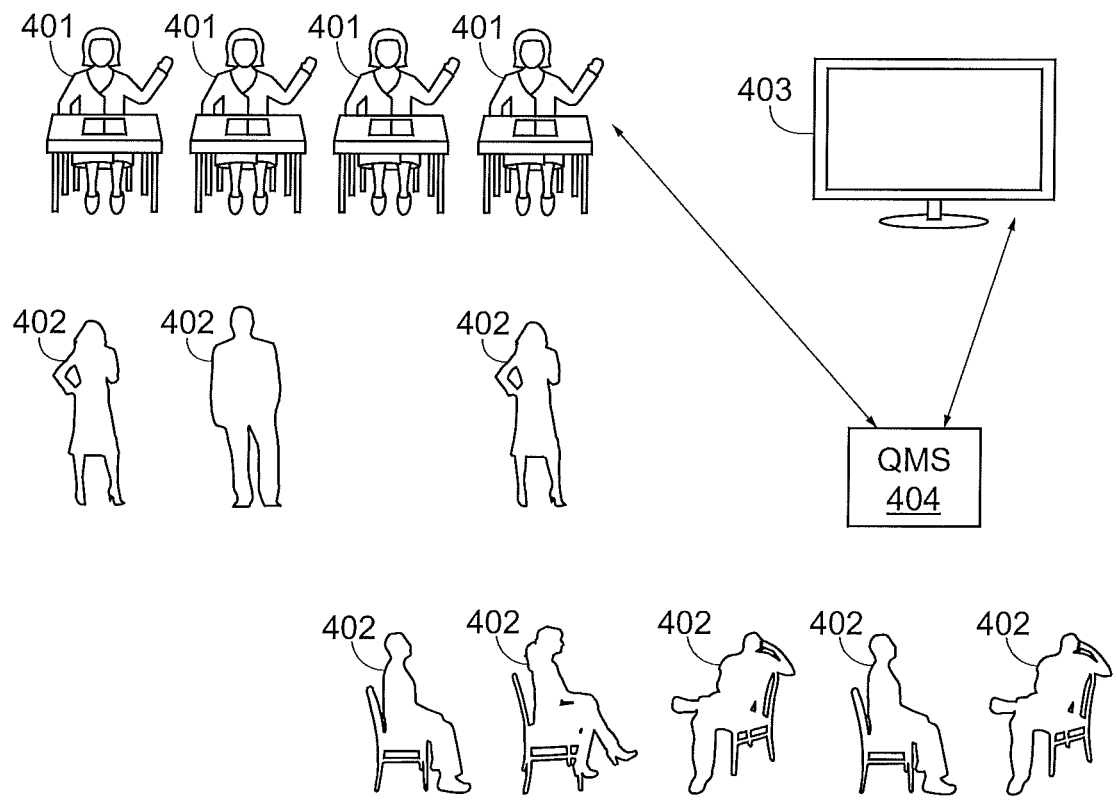
FIG. 4 shows a diagram of a prior art service provider location utilizing a queue management system.

Another prior art service provider, shown in FIG. 4, may have four (4) physical counter stations 401 where employees/agents can assist customers 402. This facility utilizes a QMS system that allows customers 402 to sit and relax comfortably while the QMS system creates a virtual queue that directs each customer 402 to a counter station 401 at the appropriate time using a video display 403. In the prior art examples shown in FIGS. 3 and 4, however, the customer wait times are essentially the same. The QMS system merely allows customers to wait comfortably in the lobby rather than standing in a line uncomfortably.

Figure 5:
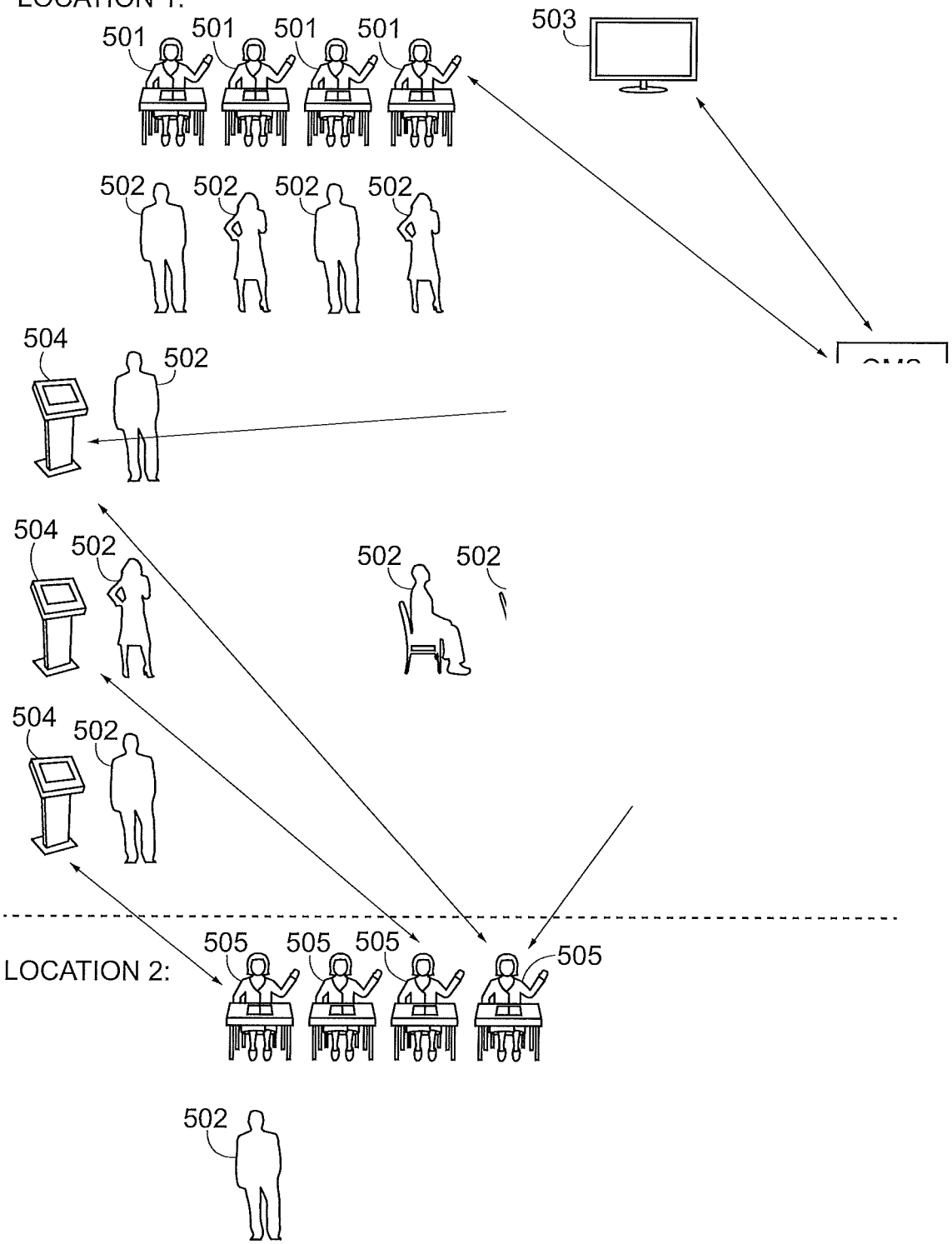
FIG. 5 shows an exemplary diagram of a queue management system of the present invention, utilizing remote service providers, according to one or more example embodiments.

In contrast, an embodiment of the present invention is shown in FIG. 5. The invention may have four (4) physical counter stations 501, housing computing devices, where local employees/agents can assist customers 502. The invention may also have multiple (three, in this example) kiosks 504 which connect customers 502 with service providers in remote locations 505, each of whom also accesses a computing device. When a customer reaches the front of the virtual QMS queue, the video display 503 may direct customers 502 to either a counter station 501 or a kiosk 504 to complete their transaction. At the kiosk 504, the customer 502 completes their transaction with a remote service provider 505, virtually. The QMS 506 communicates with the kiosks 504, the devices used by the remote service providers 505, the video display 503, and the devices located at the physical counter station 501. The inventive system analyzes which business locations have available employees with the proper skill set and uses the kiosk 504 to virtually connect eligible customers 502 to those remote service providers 505 that are otherwise being underutilized. Thus, using the inventive system, the service provider is given the ability to best utilize employees across all locations.

For example, a customer may enter a Department of Motor Vehicles Office in Charlotte, North Carolina which is very crowded and has very long queues. However, once the customer requests a position in the queue, the QMS 201 may place that customer in a queue that directs him or her to a kiosk, a workstation terminal or mobile device which virtually connects him or her to an employee in the Asheville, North Carolina, Department of Motor Vehicles Office, which happened to be much less crowded at that time.

As will be described more fully herein, in contrast to the prior art systems, the present invention reduces the number of customers waiting in the lobby; reduces the amount of time each customer waits before transacting his or her business; reduces the time of each transaction (because customers are prioritized to service providers that can most efficiently assist their particular transaction needs); allows the business to see more customers in the same time period; allows for preferred service for qualified customers; improves the overall customer experience; provides better utilization of underutilized employees; monitors, evaluates, and reports on efficiency of employees; increases productivity among employees and the enterprise by load balancing resources across multiple branches; improves customers' access to services by leveraging service queues and appointments from remote locations where services are offered, that are not available at the physical branch where the customer is present; and provides improved upsell opportunities.

Inventive System Components

In an embodiment, inventive system may comprise (a) a queue management system with optional appointment-based calendar slots; (b) at least one service provider device; and (c) at least one customer device. In an embodiment, the QMS may comprise a server, software to run the QMS, and one or more computers. In an embodiment, the service provider device and/or the customer device may each comprise a server, personal computer, mobile device, tablet, phone, wearable device, kiosk, or other electronic device. In an embodiment, the service provider device and/or the customer device may each contain proprietary software which may, in an embodiment, be part of the QMS software.

The customer device and/or service provider device may comprise a processor having one or more cores and may be configured to access and execute (at least in part) computer-readable instructions stored in the memory. The customer and/or service provider device may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The customer and/or service provider device may also include one or more application-specific integrated circuits (ASICs) or application-specific standard products (ASSPs) for handling specific data processing functions or tasks.

The customer device and/or service provider device memory may comprise one or more computer-readable storage media (CRSM). In some embodiments, the memory may include non-transitory media such as random access memory (RAM), flash RAM, magnetic media, optical media (e.g. CD-ROM, DVD-ROM, BD-ROM), read-only memory ("ROM"), erasable programmable ROM ("EPROM"), electrically EPROM ("EEPROM"), solid-state media, and so forth. The memory may be volatile (in that information is retained while providing power) or non-volatile (in that information is retained without providing power). Additionally, the memory may store an operating system that includes a plurality of computer-executable instructions that may be implemented by the computer processor to perform a variety of tasks to operate the interface(s) and any other hardware installed on the customer and/or service provider device. The memory may also store content that may be displayed by the customer and/or service provider device or transferred to other devices (e.g., monitors, headphones) to be displayed or played by the other devices. The memory may also store content received from the other devices. The content from the other devices may be displayed, played, or used by the customer and/or service provider device to perform any necessary tasks or operations that may be implemented by the computer processor or other components in the customer and/or service provider device.

In an embodiment, inventive system may comprise (a) a QMS system; (b) at least one service provider server; (c) at least one service provider device; and (c) at least one customer device. In an embodiment, inventive system may comprise (a) a QMS system; (b) at least one service provider server; (c) multiple service provider computers for employee use; and (c) multiple customer devices for communication between remote employees and customers. Various servers may store information used by QMS 201, such as but not limited to QMS software, customer data, transaction data, or other such information. Optionally, the inventive system also comprises a designated device for the check-in of customers. This device may comprise a computer, mobile device, tablet, phone, wearable device, kiosk, or other electronic device.

The queue management system may communicate with at least one service provider device and at least one customer device. Additionally, at least one service provider device may communicate with at least one customer device.

In an embodiment, the service provider device and/or the customer device has a wired or wireless internet connection. In yet another embodiment, the service provider device and/or the customer device can communicate via a cellular network, a WiFi network, or through any other class of communication network. In an embodiment, the service provider device and/or the customer device can communicate using short message service ("SMS") or multimedia messaging service ("MIMS") or a related data communication protocol. In an embodiment, the service provider device and/or the customer device supports a web browser or mobile application. In an embodiment, the service provider device and/or the customer device supports a live video feed.

Inventive System Operation

Figure 1:
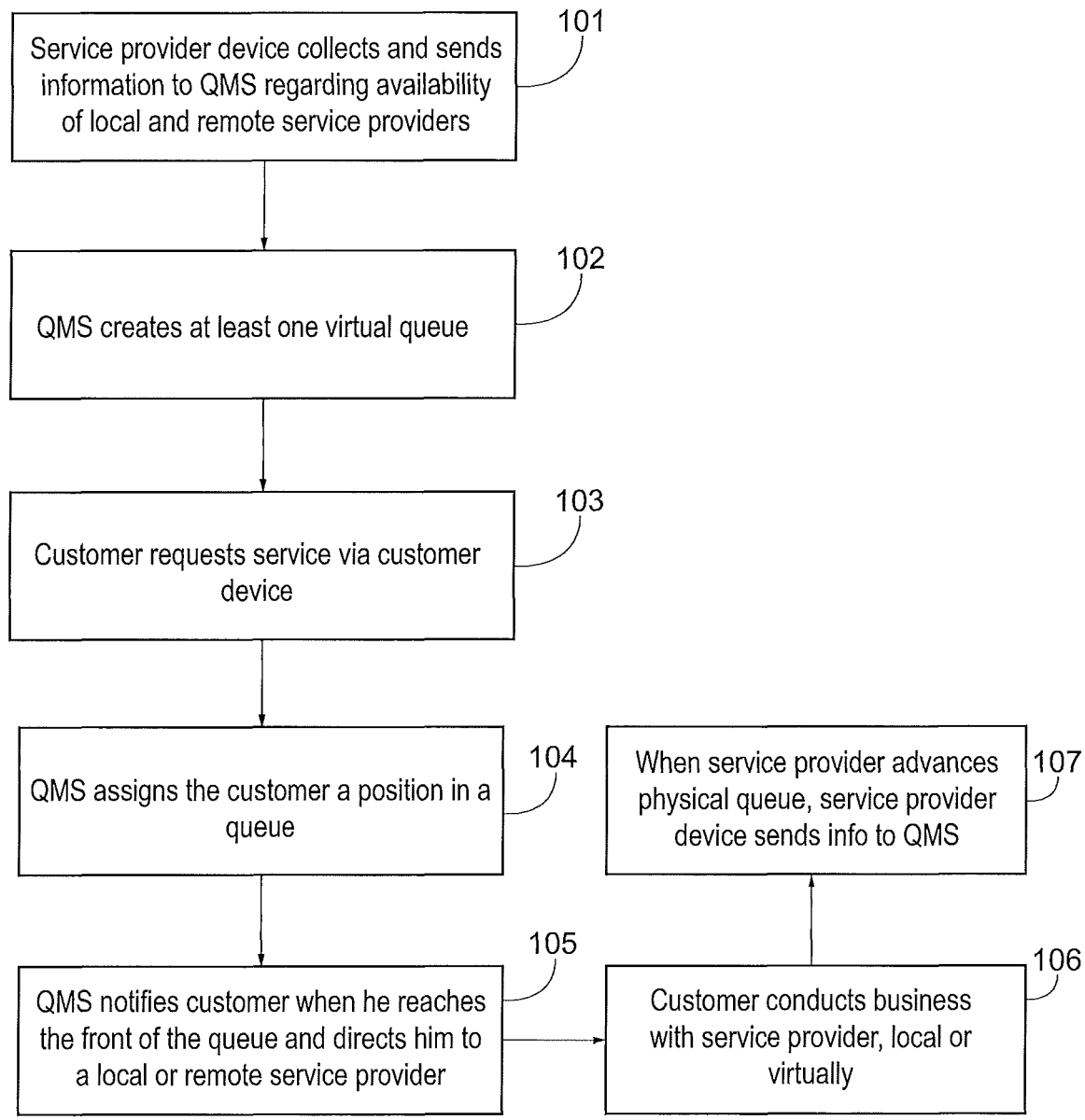
FIG. 1 shows a block diagram of a queue management system utilizing remote service providers, according to one or more example embodiments.
Figure 2:
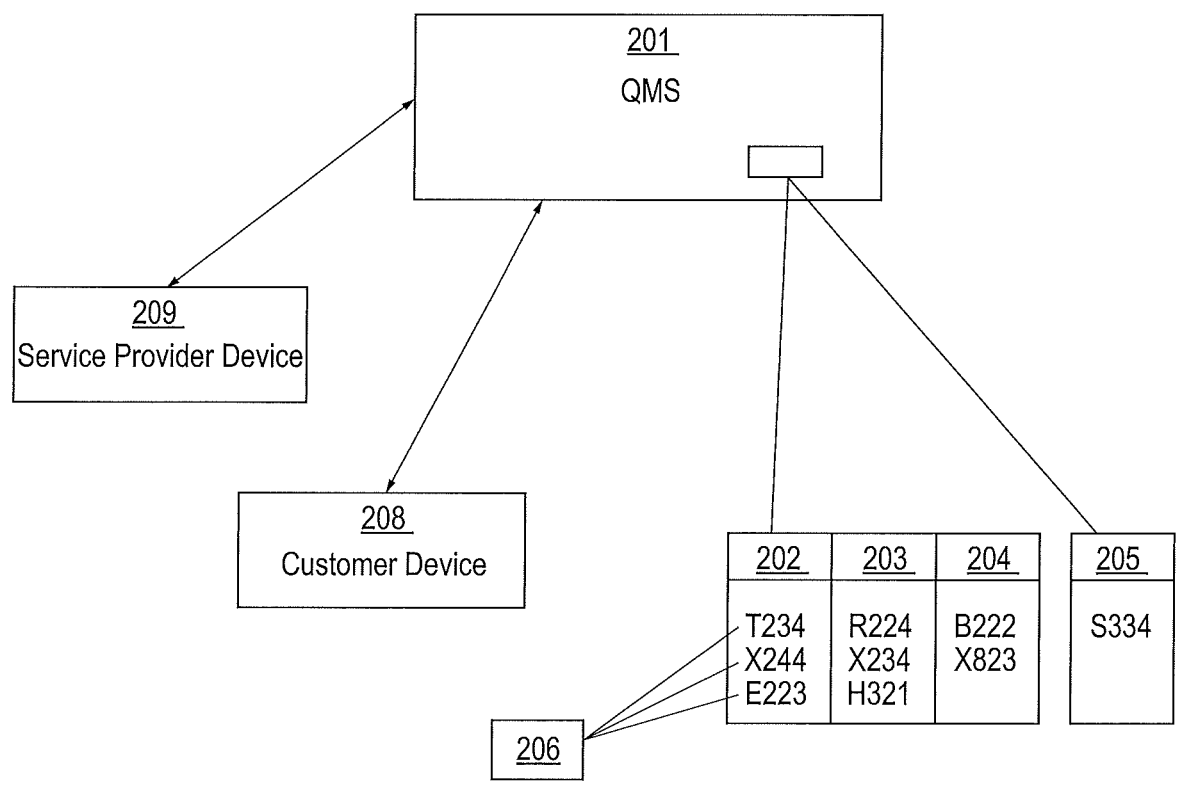
FIG. 2 shows an example of a queue management system of the present invention, utilizing remote service providers, according to one or more example embodiments.

FIGS. 1 and 2 illustrate an embodiment of how the inventive system of the present invention may operate.

Step 101: Collect Employee Information

In this embodiment, at Step 101, the service provider device 209 sends information to the QMS 201 regarding the availability of individual, human service providers across multiple office locations (local and remote service providers). This step may comprise each employee in each office logging into the system to indicate their availability; employee availability may also be pre-scheduled as an optional component. This step may also comprise collecting profile information for each employee. For example, the system may require each employee to initially input information regarding their branch location, their skill set, their experience, their language proficiencies, or the amount of time they've worked in this position; alternatively, such information may be configured by the Administrator. The system may collect historical data on each employee such as their efficiency, their upsell successes, or their customer service ratings.

Step 102: Create Virtual Queues

At Step 102, the QMS 201 creates at least one virtual queue (202, 203, 204, 205). In various embodiments, the number of queues created by the QMS 201 is related to the number of service providers available. For example, if there are four (4) service providers available across two physical office locations, the QMS 201 may create four (4) queues 202, 203, 204, 205. In another embodiment, the number of queues created by the QMS 201 is related to the types of services provided. For example, if the department of motor vehicles provides six (6) services across all locations, the QMS may create six (6) queues. In an embodiment, the QMS 201 could create the virtual queues without input from the service provider device 209 as set forth in Step 101. In an embodiment, the inventive system assigns a status to each service provider, such as "idle," "low wait," or "high wait," which can be utilized as categories in order to efficiently assign customers to appropriate queues.

Step 103: Collect Customer Information

At Step 103, at least one customer requests a service from the service provider via a customer device 208. If the location has a designated kiosk for check-in, the request may be made from the designated kiosk. In this step, the customer may be required to provide certain information and may optionally be able to provide additional information. For example, the inventive system may inquire as to what type of service(s) the customer is requesting; whether or not they are an active duty service member; if yes, whether or not they are in uniform; what their preferred language is; whether they are a walk-in or have an appointment; and/or whether they are willing to receive service virtually or whether they require a local employee. The inventive system may provide estimated wait times, which are calculated in real time, to the customer for both physical in-person service versus virtual remote service, allowing the customer to make a decision as to which selection to make based on estimated wait times in real time. Additionally, the inventive system may pull this customer's information from historical records related to historical product purchases; customer service complaints; priority status; or frequency of business visits.

The request for service may contain or generate an identifier that is unique to each individual customer. For example, each customer can be assigned a personal identification number that may or may not be provided to the customer. In an embodiment, the number of virtual queues created by the QMS 201 may correspond to the number of requests for service received by the QMS 201 from customers.

Step 104: Assign Customers to a Queue

In an embodiment, at Step 104, the QMS 201 assigns each customer a position 206 in a virtual queue, optionally using the unique identifier that was assigned to that customer. The customer position 206 may be called a token. This may be an alphanumerical identification of the customer or may be an avatar assigned to the customer. The customers may be assigned such a queue position based upon the information collected and/or identified in Steps 101 and 103 that may have special resource dependencies. For example, a customer may have requested a driver's license renewal service, but speaks only Spanish. In this case, the inventive system may assign this customer to a virtual queue in which the employee is experienced with driver's license renewals and speaks Spanish, regardless of whether this queue assigns them to a local employee or through a virtual device using a remote employee; in this case the Spanish-speaking employee serves with a resource dependency (Spanish language skill set) to serve the customer. Similarly, a customer may have requested a driving test. In this case, the inventive system may assign this customer to a queue with a local employee because a remote employee cannot virtually provide the service that has been requested. In yet another embodiment, a customer may be identified as more likely to purchase additional products based upon past purchases. In such an embodiment, the customer may be assigned to a queue with an employee (local or remote) that has a high likelihood of upselling products to the customer. Any factor known in the art may be taken into account, using the inventive system, to assign customers to a queue.

In an embodiment, a customer may be assigned a position in the virtual queue on a first-come, first-served basis, on a priority basis, or on other basis known. In an embodiment, the inventive system comprises a method for providing prioritized customers with priority service. In this embodiment, a customer is identified as a priority customer based upon information collected or stored in the system database. As an example, a service member that is in uniform may be identified as a priority customer. The customer may then be prioritized to a queue or appointment category for a local service provider rather than a remote service provider. The customer may be placed at the front of such queue, or given preferred access to appointment slots in an embodiment. In another embodiment, however, the priority customer may be placed in a queue based upon an algorithm which is part of the inventive system. In this embodiment, the inventive system may analyze the type of service the customer has requested, the average transaction time for that transaction and the current wait time at the location. The inventive system may then use the algorithm to create a load balancing effect, such that the priority customer does not necessarily move immediately to the front of a queue, but is placed in a queue so that the priority customer does not wait for service for more than five (5) minutes, or any other timeframe desired.

The customer may or not be informed as to which queue they have been assigned. The QMS 201 may change the queue to which a customer is assigned during the wait time, again with or without notifying the customer of the same.

Step 105: Notify Customer of Queue Position

In an embodiment, shown in Step 105, the customer is notified when he is at or near the front of the queue and may be directed to a particular room, table, or counter location to speak with a service provider that is physically located within the facility in which the customer is located. Alternatively, the customer may be directed to a kiosk, computer, or similar device, or to a portal on his personal phone or mobile device which connects the customer with a virtual service provider located in a remote physical location.

The customer may be notified in a variety of ways, as are known in the art. Notification may be presented to the customer via SMS, MMS, phone call, email, instant messaging, notifications within a mobile application, audible alarms or announcements, display of information on a screen within the service provider's facility, a pager, an RFID device, a GPS device, or any other method known in the art. In a particular embodiment, the service provider device 209 displays information regarding the virtual queue status on a customer-facing monitor within the facility. In an embodiment, the customer may select what type of notification he or she prefers, how much advanced notice he or she would like, or any other selectable feature known.

In various embodiments, the QMS 201 may periodically, constantly, or in response to inquiries from the relevant customer device 208 or service provider device 209, communicate with both the service provider device 209 and the customer device 208. This communication may comprise the status of the customer's position in the virtual queue, estimated wait times, the overall status of the virtual queues, the number of people in the virtual queue, the availability of the employees/resources within the service provider entity, or any information of the like.

In an embodiment, the customer may use the customer device 208 to send a request to the QMS to exit the virtual queue if, for example, they can no longer stay for their requested service. In this embodiment, the QMS 201 updates the virtual queues accordingly.

In another embodiment, the customer may use the customer device 208 to voluntarily place themselves in an "on hold" or "frozen" status so that they will not be called to the front of the queue during a time period wherein he or she may need to step outside of the facility to take a phone call or attend to a personal matter. In this embodiment, the customer may use the customer device 208 to remove themselves from the "on hold" or "frozen" status once they have completed the personal matter and want to reenter the active queue.

In an alternative embodiment, the inventive system may detect when a customer leaves a certain radius of the facility (via GPS or other technology) and may automatically place the customer in an "on hold" or "frozen" status until they system detects that they have returned to the facility.

Step 106: Customer Transacts Business

At Step 106, the customer approaches the service provider to which he was directed in Step 105 and conducts his or her business transaction. In an embodiment, the customer is directed to a local service provider and approaches a service counter in order to conduct such business. In another embodiment, the customer is directed to a customer device to be virtually connected to a remote service provider. In an embodiment, the customer device is a kiosk, personal computer, mobile device, tablet, phone, wearable device, or other electronic device. In a particular embodiment, the customer device is a kiosk.

Kiosk Components

In this embodiment, the kiosk (or any other device utilized) may have a display, audio and video input and output capabilities, a video camera, a microphone, a recording device, and/or a speaker and/or any other peripherals which allow the service provider to interact virtually with the customer in a face-to-face manner. The display may be used to show content to a user in the form of text, images, or video. In an embodiment, the kiosk comprises a computer, keyboard, numeric pad, mouse, trackball, pointing device, scanner, and/or touch screen for input and exchange of information. In an embodiment, the kiosk has a printer for printing of information, receipts, prescriptions, or other documentation. In an embodiment, the kiosk may include one or more payment devices. The payment device may include a card reader to read payment and/or account information from a debit or credit card, including magnetic readers as well as wireless (e.g. radio frequency or near field communication) readers. The payment device may also include a cash acceptor for receiving paper and/or coin currency. In an embodiment, the kiosk has authentication capabilities. For example, the kiosk may have facial recognition capabilities or biometric capabilities in order to verify identity. In an embodiment, the kiosk is adapted for headphones. The kiosk may have privacy screens and may mask personal information as it is input.

Kiosk Operation

Once the customer is authenticated, a conference is initiated between the customer and the remote service provider. In an embodiment, software is provided on the kiosk which connects to the QMS system, the kiosk, the remote service provider device, and, optionally, the local service provider devices. The software may interact with the video display screens, video cameras, or other peripherals during a session in order to render and provide the images and audio of the participants to one another. Typically, a video image of each participant is provided, via a video display window, to the other member(s) of the conference. The kiosk may utilize an internet connection, broadband network connection, Integrated Services Digital Network (ISDN) line, conventional telephone line, or other similar network for communication purposes.

The customer and remote service provider may then communicate, virtually, but in a face-to-face method using audio and video technology. The audio and video technology may be any known in the art, for example, cloud-hosted video technology. Video technology such as that available from Zoom Video Communications, Inc. (Zoom™), Citrix Systems, Inc. (GoToMeeting™), or Cisco Systems, Inc. (WebEx™) could be utilized in the present invention and may connect to the QMS system via the application programming interface. In an embodiment, the video conferencing and/or entire inventive system may be encrypted. The employee and customer may exchange documentation via the scanner, they may ask questions of one another, and/or they may input information into the system using a keyboard or touch screen.

In an embodiment, more than two parties in more than two physical locations may participate in the customer/service provider video conference. In such an embodiment, a multipoint control unit (MCU) may be used. An MCU allows multiple parties to communicate over these systems and use various mechanisms, such as voice activation and motion detection, to determine which endpoint's image to display on the screen at any moment in time. In an embodiment, multiple participants to a video conference are shown on a split screen. This may be useful in a situation where one employee has particular expertise in a service, but another employee is needed to serve as a translator for the customer. Likewise, the inventive system may allow the employee to transfer the video conference to another remote employee with different or better experience for the particular request.

If necessary or desired, the inventive system may, in an embodiment, assign the customer to a particular local or remote service provider for follow up appointments and/or services. The inventive system may assign the customer a priority queue position to see the same service provider (local or remotely) for follow up services in this embodiment.

Step 107: Upon Completion of Services, Advance the Queue

In an embodiment, at Step 107, once a customer has been provided with requested services, the service provider uses his or her service provider device 209 to send confirmation of the completed services to the QMS 201. The QMS 201 then updates the virtual queues accordingly. The service provider may then manually advance the queue by pressing a button entitled "next customer" on the service provider device 209 or by providing a similar instruction to the system. Alternatively, the inventive system may automatically advance the queue once a service is completed and assign a new customer to the service provider. In another embodiment, the service provider may select from multiple choices for calling the next customer such as, for example, "any service," "license renewals only," or "registration renewals only." Any of these options may be enabled or disabled within the inventive system.

In an embodiment, there may be various post-service follow-up calls, virtual appointments, services, surveys, future appointment reminders, or similar services that may be coordinated, provided, and/or initiated using the inventive system. In this embodiment, the inventive system may create additional queues that are designated for post-service needs. As an example, one or more queues may be created for follow-up calls from a service provider to a customer. As set forth herein, those queues may be prioritized in any manner known in the art. A follow-up queue may be associated with a particular service provider or with service providers of a certain categories (i.e. those skilled in a particular service or those that speak a particular language). One or more service providers may be prompted to contact a particular customer to provide follow-up services after the appointment has concluded. These service providers may be physically located in the customer's local area or may be physically remote to the customer. The follow-up services may include phone calls, virtual meetings via a smart device or computer, or any other mechanism described herein. More than one follow-up service can be provided to the same customer using the inventive system, as needed. As another example, the inventive system may provide a follow-up service comprising an automated survey that is forwarded to all customers or to particular customers. Data received from the survey may be utilized to improve the internal processes of the company utilizing the inventive system.

Alternative Inventive Features

Remote Customer

In an embodiment, the customer may be remote from any and all service provider locations. In this embodiment, the customer may be at work, at home, or at the park. The customer may use his personal computer, phone, mobile device, or other smart device as the customer device 208. The customer may check-in to a particular location using his personal customer device 208, be placed within a queue or checked in for an appointment, and his personal customer device 208 may be notified when he is nearing the front of the assigned queue. In an embodiment, the inventive system uses global positioning system ("GPS") technology to identify the location of the customer and notify him or her of his or her queue status within an appropriate amount of time such that he or she will be able to advance to the service provider in a timely manner. In this embodiment, the remote customer may be required to physically be present at the service provider location for his requested services.

In another embodiment, if a remote customer (at home or at work, for example) logs in remotely using his personal customer device 208, but requires an in-person service, the inventive system will direct the customer to a particular physical location of the service provider based upon the length of queues/wait times in particular offices, based upon the specialization of particular offices, or on any other basis known in the art. For example, if there are three (3) service provider locations in a town, the inventive system may communicate to the customer which location he should visit in order to most efficiently transact his particular matter.

In any example wherein a customer checks-in using his personal customer device 208 but visits a service provider location for performance of the services, the inventive system may generate a QR code on the personal customer device 208. Upon arrival at the service provider location, the customer may be able to scan the QR code using the service provider device 209 to notify the inventive system that he has arrived. Alternatively, the inventive system may use GPS technology, beacon technology, near frequency communication ("NFC"), Bluetooth technology, RFID technology or any other technology known in the art to check-in and/or notify the QMS that the customer has arrived at the location.

In yet another embodiment, the remote customer may not need to be physically present at the service provider location for his requested services. In this embodiment, the inventive system may provide the customer with a link or portal on their personal customer device 208 which allows an audio or video link with a remote service provider device 209. In this example, the entire transaction, from check-in through completion of the service(s), may be completed on the customer's personal customer device 208.

Location Transfers

In some embodiments, it may be necessary or beneficial to transfer a customer from one business location to another business location. For example, if the customer requires a prescription and the particular medication is immediately available at another business location, the inventive system may analyze which business locations are available for that particular product/service and, optionally, which business locations have shorter queues or are closer in proximity to the current location, for example. After analyzing the data, the system may then direct the customer to the appropriate alternative business location through the customer device 208. Alternatively, the inventive system may direct the service provide to tell the customer to visit the appropriate alternative business location, through the service provider device 209. Once the customer arrives at the alternative business location and checks-in, the customer may be prioritized into a queue based upon his previous check-in at the first business location. Thus, the customer may not automatically be placed at the end of the queue based upon his arrival time at the alternative business location. In a particular embodiment, the inventive system can freeze the customer's ticket during the time that it takes the customer to travel from one business location to the other business location and then reactivate the ticket when the customer arrives at the new business location.

Workforce Optimization Plan

The inventive system may provide businesses with a workforce optimization plan. In this embodiment, the system may collect, analyze, and provide reports on historical data regarding the number of employees, the number of customers each employee serves per time period, the number/value of sales made by each employee, total business idle time, idle time by office or business unit, and/or idle time by employee. The system may also provide data, analysis, and reports that indicate which employees are more efficient with particular service requests, which employees are most profitable, which hours of the business are busiest or most productive, the productivity of the business by office, and the like. Using the above data and analyses, the system may make workforce efficiency recommendations as to the most efficient use of particular employees, during particular business hours, in particular offices, in order to reduce overall idle time. Businesses may be able to reduce the number of employees working during off-peak hours, reallocate their existing employee resources in a more effective manner, and/or may be able to better utilize employees that are particularly efficient and profitable. Because employees are aware that this data is being analyzed, productivity among employees may improve.

The inventive system can additionally provide data and recommendations regarding the efficiencies of a particular office, location, or business unit on the basis of types of matters or issues. For example, the Asheville, NC DMV may handle vehicle registration renewals more efficiently than any other office in Western NC Accordingly, the organization may decide to route the majority of these types of matters to the Asheville, NC DMV office.

In these embodiments, the improved queuing processes may be automated based upon this historical data or may be manually customized by management level employees of the business.

Customer Service Feedback

In an embodiment, the inventive system may record video and/or voice during a customer session through the customer device 208. In this embodiment, the recording of the session may provide customer service feedback regarding customer tone, customer complaints, particular keywords, or the like.

Administrative Viewer

In an embodiment, all employees or one or more administrative level employees may be able to view, at any time, the number of customers in each queue, the number of customers by priority, the number of customers by service requested, the identities of individual customers, the wait time for each individual customer, and any other set of criteria known in the art. The system may also provide real time data for each customer regarding arrival time, status, service time, wait time, and any other factor known in the art. The business administrator may be able to use the inventive system to override the queue assignments and serve particular customers in any desired order.

Exemplary Advantages of the Invention

As noted above, the inventive system reduces the number of customers waiting in the lobby. As customers are assisted by remote service providers through the inventive solution, they move through the business location more quickly and free up waiting area space and congestion. Additionally, the inventive system reduces the amount of time each customer waits before transacting his or her business. Not only is the customer able to wait comfortably in a chair in a lobby environment, but the customer also waits for a shorter period of time and, accordingly, has an improved customer experience as a result. This is accomplished by more efficiently directing each customer to a service provider, local or remote, that is uniquely adapted to handle their service request.

The present invention also has the advantage of reducing the total time of each transaction because customers are prioritized to service providers that can most efficiently assist their particular transaction needs, as described above. The inventive system allows for preferred service for qualified customers, which can result in improved experiences for those customers, increased sales to those customers, and more frequent visits by those customers, improving the overall revenues of the business. The invention allows the business to see more customers in the same time period, improving the customer experience and increasing the overall productivity of the business itself.

In addition, as set forth above, the invention allows businesses to analyze and improve the efficiency and functionality of its employees using the workforce optimization plan. In an embodiment, the inventive system can provide recommendations for employee scheduling.

Finally, the inventive system may provide increased revenues and additional upsell opportunities. The inventive system can analyze historic data and identify particular customers that are more likely to purchase additional products or services. The system can then assign those customers to a particularly profitable employee, improving the likelihood that the customer will have a good experience and purchase additional products or services.

These advantages result in a better customer experience, leading to more repeat customers. In addition, these advantages result in reduced overall costs for the organization and increased overall revenue for the organization, as the same number of employees are able to do more work than they could previously and more customers can be seen in the same time period. By no means are the advantages recited herein intended to be a complete and full listing of all advantages of the invention.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

While certain embodiments of the present disclosure have been described in connection with what is presently considered to be the most practical and various embodiments, it is to be understood that the present disclosure is not to be limited to the disclosed embodiments, but is intended to cover various modifications and equivalent arrangements included within the scope of the appended claims. Although specific terms are employed herein, they are used in a generic and descriptive sense only and not for purposes of limitation.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

That which is claimed:

1. A queue management system for service providers comprising:
   a plurality of service provider computing devices located in at least two different service provider facilities;
   a customer input device, wherein the customer input device is configured to prompt a customer to select from a plurality of services offered and receive a customer service request from a customer;
   a customer communication device located in a first service provider facility, wherein the customer communication device is configured to facilitate communication between a service provider located in a second service provider facility and the customer located in the first service provider facility; and
   a queue management server comprising a processor, and a memory including computer program code configured to, with the processor, cause the queue management server to:
      receive availability information for a plurality of service providers from the plurality of service provider computing devices;
      generate a plurality of virtual queues;
      receive a customer service request from a customer input device identifying the type of service requested;
      assign the customer service request to a queue position in a virtual queue, based at least in part on the availability information associated with the plurality of service providers and the type of service requested, wherein the virtual queue is for an in-person service provider in the first service provider facility or for a remote service provider in the second service provider facility; and
      notify a customer associated with the customer service request of the assignment, wherein the customer is assigned to a customer communication device located in the first service provider facility for service of the request by a customer service provider located in the second service provider facility when the customer is assigned to the remote service provider,
   wherein the computer program code, when executed, is configured to cause the processor to consider a virtual queue for an in-person service provider as well as a virtual queue for the remote service provider when determining the virtual queue that the customer should be assigned to.

2. The queue management system of claim 1, wherein the customer input device and the customer communication device comprise the same device.

3. The queue management system of claim 1, wherein the computer program code is further configured to, with the processor, cause the queue management server to:
   receive an indication of service completion from a service provider device; and
   advance the virtual queue based on the indication of service completion.

4. The queue management system of claim 1, wherein the availability information comprises an indication of whether the service provider is currently assisting a customer.

5. The queue management system of claim 4, wherein the availability information additionally comprises an indication of a service provider facility location for each service provider.

6. The queue management system of claim 5, wherein the availability information additionally comprises profile information for each service provider, wherein the profile information is selected from the group consisting of service provider skills, experience level, language proficiencies, and time in position.

7. The queue management system of claim 6, wherein assignment of the customer service request to a queue position in a virtual queue is based, at least in part, on the profile information.

8. The queue management system of claim 1, wherein the computer program code is further configured to, with the processor, cause the queue management server to:
   receive an indication of a priority customer; and
   assign a prioritized queue position in the virtual queue to the priority customer or assign the priority customer a queue position in the virtual queue associated with an estimated wait time less than a predetermined timeframe.

9. The queue management system of claim 1, wherein the computer program code is further configured to, with the processor, cause the queue management server to:
   receive an indication of a hold request associated with the customer service request; and
   cause other customer service requests in the virtual queue to advance around the customer service request associated with the hold request.

10. The queue management system of claim 9, wherein the computer program code is further configured to, with the processor, cause the queue management server to:
    receive an indication of a hold end associated with the customer service request; and
    cause the customer service request to advance within the virtual queue in response to the virtual queue hold end.

11. The queue management system of claim 9, wherein the indication of a hold request comprises an indication of the customer leaving a predetermined service provider facility radius.

12. The queue management system of claim 1, wherein the computer program code is further configured to, with the processor, cause the queue management server to:
    receive an indication of indication of a queue exit; and
    cause the customer service request to be removed from the virtual queue.

13. The queue management system of claim 1, wherein the notification of the assignment is communicated to the customer via the customer input device, the customer communication device or a separate customer display device.

14. The queue management system of claim 1, wherein the customer communication device facilitates communication between the customer and the assigned service provider via at least one of video conferencing, teleconferencing, or information transfer between the customer communication device and the assigned service provider device.

15. The queue management system of claim 1, wherein generating a plurality of virtual queues results in a certain number of virtual queues being created, wherein the number of queues created correlates to the plurality of services offered.

16. A queue management system for service providers comprising:
    a plurality of service provider computing devices located in at least two different service provider facilities;
    a customer device that is configured to prompt a customer to select from a plurality of services offered and receive a customer service request from a customer, wherein the customer device is configured to facilitate communication between the customer and a service provider located in a first service provider facility; and a queue management server comprising a processor, and a memory including computer program code configured to, with the processor, cause the queue management server to:
  receive availability information for a plurality of service providers from the plurality of service provider computing devices;
  generate a plurality of virtual queues;
  receive a customer service request from a customer device identifying the type of service requested;
  assign the customer service request to a queue position in a virtual queue based at least in part on the availability information associated with the plurality of service providers and the type of service requested, wherein the virtual queue is for a remote service provider in the first service provider facility or for an in-person service provider in the first service provider facility; and
  notify a customer associated with the customer service request of the assignment,
wherein the computer program code, when executed, is configured to cause the processor to consider a virtual queue for an in-person service provider as well as a virtual queue for the remote service provider when determining the virtual queue that the customer should be assigned to, wherein each of the plurality of service provider computing devices are configured to facilitate communication with the customer device.

17. The queue management system of claim 16, wherein the customer device is at least one of personal computer, a mobile device, a tablet, at phone, or a wearable device.

18. The queue management system of claim 16, wherein the customer device facilitates communication between the customer and the assigned service provider via at least one of video conferencing, teleconferencing, or information transfer between the customer device and an assigned service provider computing device.

19. The queue management system of claim 18, wherein each of the customer device and the plurality of service provider computing devices comprise at least one of a display, a video camera, a microphone, a recording device, or a speaker to facilitate communication.

20. The queue management system of claim 18, wherein the customer device facilitates communication between the customer and two or more service provider computing devices simultaneously.

* * * * *